United States Patent [19]

Boerner

[11] 3,805,280

[45] Apr. 16, 1974

[54] EXPOSURE CONTROL SYSTEM FOR PHOTOGRAPHIC APPARATUS

[75] Inventor: Gerhard Boerner, Musberg, Germany

[73] Assignee: Robert Bosch Photokino GmbH, Stuttgart, Germany

[22] Filed: Sept. 27, 1972

[21] Appl. No.: 292,629

[30] Foreign Application Priority Data
Oct. 8, 1971  Germany.............................. 2150250

[52] U.S. Cl..................... 354/43, 95/64 D, 352/141
[51] Int. Cl........................... G03b 9/02, G01j 1/42
[58] Field of Search............ 95/10 C, 64 D; 352/141

[56] References Cited
UNITED STATES PATENTS

| | | | |
|---|---|---|---|
| 3,209,667 | 10/1965 | Coutant.......................... | 352/141 X |
| 3,542,462 | 11/1970 | Bertram........................... | 352/141 |
| 3,547,022 | 12/1970 | Baron et al. ........................ | 352/141 |

Primary Examiner—Joseph F. Peters, Jr.
Attorney, Agent, or Firm—Michael S. Striker

[57] ABSTRACT

A photographic apparatus wherein the entire exposure control system constitutes a single prefabricated module which is detachably mounted in the photographic apparatus and whose components include an adjustable diaphragm, an electric circuit which adjusts the diaphragm as a function of scene brightness, a prism for deflecting a first portion of incoming scene light into the view-finder, and a mirror for directing a second portion of incoming scene light against a photoelectric transducer of the electric circuit. The transducer may constitute the energy source of the circuit. Alternatively, a discrete source of electrical energy may be mounted in the photographic apparatus or directly in or on the frame of the module. The energy source can be installed on a detent lever for the module so that it can be reached in response to pivoting of the lever from an operative position.

8 Claims, 3 Drawing Figures

EXPOSURE CONTROL SYSTEM FOR PHOTOGRAPHIC APPARATUS

BACKGROUND OF THE INVENTION

The present invention relates to photographic apparatus in general, and more particularly to improvements in photographic apparatus of the type wherein the size of the aperture furnished by the diaphragm is automatically adjustable as a function of scene brightness and wherein a portion of incoming scene light is deflected to impinge upon one or more photosensitive transducers and/or to enter the viewfinder.

The exposure control system constitutes one of the most important and most complex components of a photographic apparatus. As a rule, the exposure control system must be accurately adjusted subsequent to its mounting in the body or housing of the photographic apparatus, i.e., subsequent to at least substantially completed assembly of its parts in the housing. This is due to the fact that the exposure control system must cooperate with a host of other components such as the camera release, the mechanism which transmits mechanical or other signals in response to insertion of a cassette or cartridge to account for the type and/or sensitivity of film in the inserted cartridge, and/or others. The fact that the exposure control system must be operatively connected with many other components contributes to its complexity, especially since the testing of the exposure control system necessitates a practically complete assembly of the entire photographic apparatus owing to the very fact that the parts of the exposure control system cooperate with so many other components.

Therefore known attempts to simplify the construction, mounting and connection of the exposure control system invariably include the assembly of the exposure control system in the form of several discrete prefabricated modules. Such construction of the exposure control system exhibits a number of serious drawbacks, particularly as concerns the complexity of the assembling operation, because the discrete modules must be operatively connected not only with other components in and/or on the housing of a photographic apparatus but also with each other. Furthermore, one or more modules cannot be readily reached upon completed installation of all modules, and the establishment of operative connections between the modules as well as between the modules and other components must be entrusted to highly skilled technicians.

SUMMARY OF THE INVENTION

An object of the invention is to provide a novel and improved exposure control system which can be rapidly and conveniently installed in or removed from a still camera or motion picture camera and which can be rapidly connected to or disconnected from other components of a still camera or motion picture camera.

Another object of the invention is to provide a compact, lightweight and relatively inexpensive exposure control system whose installation and/or removal and even testing can be entrusted to semiskilled persons and whose reliability, accuracy and other characteristics compare favorably with those of presently known multiple-module exposure control systems.

A further object of the invention is to provide an exposure control system which contributes to a substantial simplification in the construction and assembly of the entire photographic apparatus.

An additional object of the invention is to provide an improved diaphragm for use in the above outlined exposure control system.

The invention is embodied in a photographic apparatus which comprises a housing or body and an exposure control system provided in the housing and comprising a plurality of components including adjustable diaphragm means, means for adjusting the diaphragm means as a function of scene brightness, and means for deflecting at least one portion of incoming scene light (e.g., a prism for deflecting light into the viewfinder and/or a mirror for reflecting some scene light against a photosensitive transucer forming part of the means for adjusting the diaphragm means). In accordance with a feature of the invention, all components of the exposure control system form part of a single module which is preferably removably installed in the housing and is held in a predetermined position by cooperating with separable first and second coupling means which are respectively provided in or on the housing and in or on the frame of the single module.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 3:
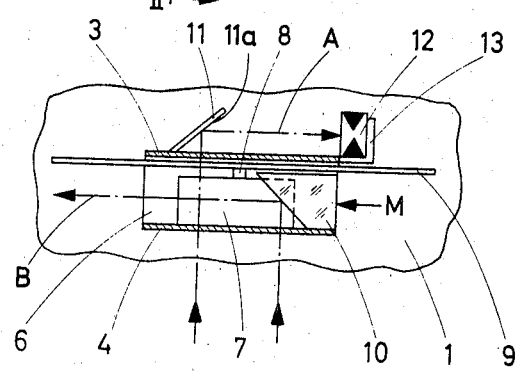
FIG. 3 is a sectional view as seen in the direction of arrows from the line III—III of FIG. 1.

The drawing shows a portion of the housing 1 in a photographic apparatus. The beam of incoming scene light which has passed through the picture taking objective (not shown) is indicated by the phantom-line circle 2. In accordance with the invention, the housing 1 receives a single readily insertable and readily detachable module M which is placed across the path of the light beam 2 and serves to admit controlled amounts of light against the foremost unexposed film frame (not shown) as well as to direct some incoming light against a photosensitive transducer 12 (see the arrow A in FIG. 3) and into a viewfinder (see the arrow B).

The module M comprises a frame or carrier including two spaced apart parallel rectangular panels 3 and 4 which are held at a requisite distance from each other by distancing members 5 and 6. The panel 4 supports a light meter 7 here shown as a moving-coil instrument having a rotary output shaft 8 which is connected with and serves to move a diaphragm vane or blade 9 having a substantially horn-shaped light-transmitting opening 9a. The panel 4 further supports a prism 10 which serves to direct a portion of the incoming light beam 2 into the viewfinder (arrow B in FIG. 3).

The other panel 3 is provided with a V-shaped slit to form a lug 11 which is bent out of the general plane of the panel 3 and has a mirrored surface 11a to deflect from the beam 2 some light (arrow A in FIG. 3) against the photosensitive transducer 12. The latter is mounted on a bracket 13 which is attached to the outer side of the panel 3 opposite the mirrored surface 11a of the lug 11.

Figure 1:
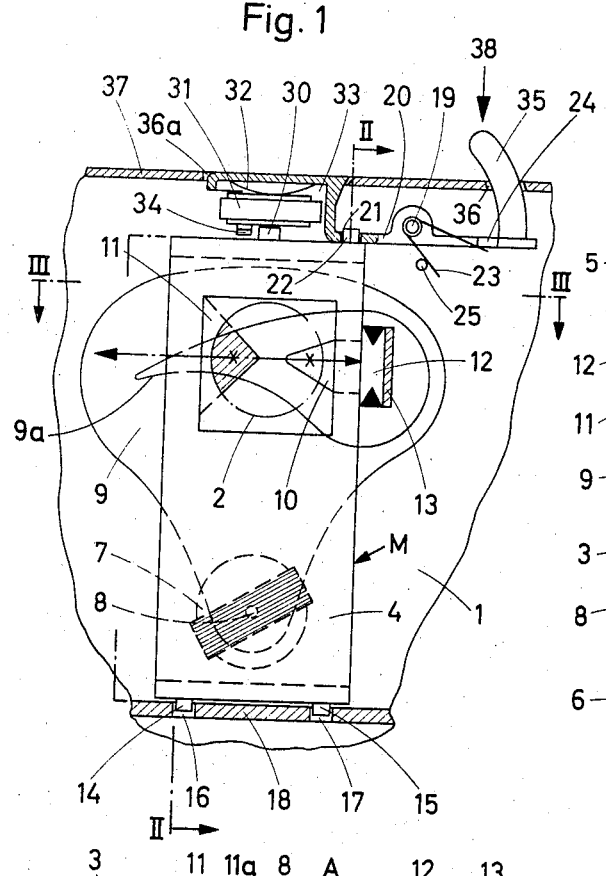
FIG. 1 is a fragmentary vertical sectional view of a photographic apparatus and an elevational view of the improved module which is shown in its operative position.
Figure 2:
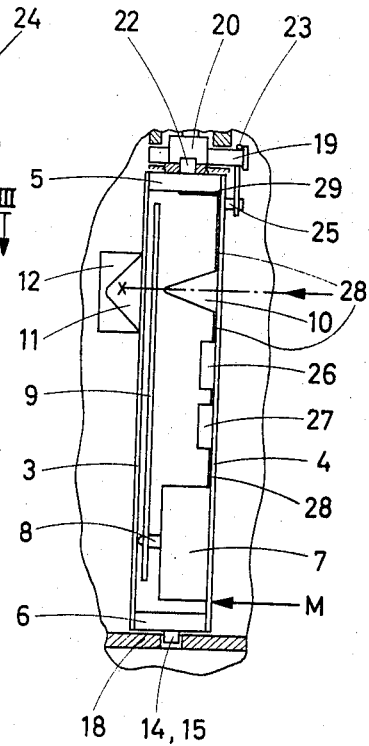
FIG. 2 is a sectional view substantially as seen in the direction of arrows from the line II—II of FIG. 1.

The distancing member 6 is provided with male coupling members in the form of projections or pins 14, 15 received in complementary sockets 16, 17 of a wall 18 which forms part of the housing 1. When the pins 14, 15 are received in their respective sockets 16, 17, the module M is properly mounted in the interior of the housing 1. The detent means for releasably holding the module M in the housing 1 comprises a two-armed lever 20 which is pivotable on a stationary pin 19 and is biased in a counterclockwise direction, as viewed in FIG. 1, by a torsion spring 23. One leg of the spring 23 bears against a lateral projection 24 of the lever 20 and its other leg reacts against a stationary post 25. The spring 23 is coiled around the pivot pin 19. The left-hand arm of the lever 20, as viewed in FIG. 1, is provided with a bore, recess or socket 21 serving to receive a detent pin 22 on the distancing member 5 of the module M. The right-hand arm of the lever 20 is further provided with a protuberance or knob 36 extending outwardly through an opening 36 in the top wall 37 of the housing 1 so that it can be depressed by a finger (see the arrow 38) against the opposition of the torsion spring 23 in order to disengage the socket 21 from the pin 22 and to thus allow for removal of the module M from the housing 1.

The aforementioned lug 11 of the panel 3 can be shaped as a concavo-convex body whose convex side is mirrored to disperse the light beam portion A. This insures that the dispersed light reaches the entire photosensitive surface of the transducer 12 even if the movable diaphragm vane 9 greatly reduces the size of the light-admitting aperture.

In addition to the aforedescribed electrical, mechanical and optical parts, the panel 3 and/or 4 may support one or more additional electrical and/or electronic parts of the exposure control system. In the illustrated embodiment, the inner side of the panel 4 supports two transistors 26, 27 as well as a printed circuit 28 which can conduct current between the transistors, transducer 12, light meter 7 and/or other parts of the exposure control circuit. The printed circuit 28 is connected with or includes a conductor 29 which is further connected with a stationary contact 30. The latter extends outwardly through the distancing member 5 and is engaged by one pole of a button-type cell 31 constituting a replaceable source of electrical engergy. The cell 31 is biased against the contact 30 by a current-conducting leaf spring 32 mounted on the left-hand arm of the lever 20, as viewed in FIG. 1. This left-hand arm constitutes a cupped or spoon-shaped receptacle 33 for the cell 31. The receptacle 33 has suitably configurated retaining arms 34 which insure that the cell 31 remains in the receptacle when the lever 20 is pivoted in response to depression of the knob 35. The cell 31 can be readily removed from the receptacle 33 because it is biased against the arms 34 by the relatively weak spring 32. The opening 36 and a window 36a for the receptacle 33 are provided in the top wall 37. The window 36a is filled by the receptacle 33 when the lever 20 is allowed to assume the operative position shown in FIG. 1.

The contact 30 can be said to form part of the coupling means for separably mounting the module M in a predetermined position relative to the housing 1. At the same time, the contact 30 forms part of conductor means 29, 30 for connecting the cell 31 with the current-consuming components (such as 7, 26, 27) of the exposure control system.

The size of the aperture furnished by the diaphragm respectively increases and decreases when the output-shaft 8 of the light meter 7 turns the vane 9 in a counterclockwise and clockwise direction, as viewed in FIG. 1. Such turning of the vane 9 changes the illuminated area of the reflecting surface 11a so that the amount of light which reaches the transducer 12 is a function of the angular position of the vane 9. The configuration of the opening 9a, prism 10 and lug 11 can be readily selected in such a way that the ratio of the size of the diaphragm aperture (f/stop) to the illuminated area of the surface 11a remains constant for all angular positions of the vane 9. This insures that the transducer 12 will cause the light meter 7 to adjust the diaphragm with a view to furnish an appropriate f/stop for each scene brightness.

The cell 31 can be reached for inspection or replacement in response to application of finger pressure (arrow 38) against the knob 35. The pivoting of the lever 20 results in an unlocking of the module M so that the latter can be removed from the housing 1 by the simple expedient of lifting the pins 14, 15 out of the respective sockets 16, 17 in the wall 18. The reinsertion of the module M into the housing 1 is equally simple; the operator depresses the knob 35 prior to insertion of pins 14, 15 into the sockets 16, 17 and thereupon allows the torsion spring 23 to return the lever 20 to the illustrated position. The module M can be tested prior or subsequent to insertion into the housing 1.

If desired, the cell 31 or another suitable source of electrical energy can be mounted in such a way that it is electrically connected with the current-consuming parts of the module M by one of the coupling members 14, 15, 21. Thus, such coupling members can perform retaining and current-conducting functions. Also, the cell 31 can be omitted altogether if the transducer 12 is a photoelectric cell. Still further, the cell 31 or another source of electrical energy can be mounted in or on a receptacle in the frame 3–6 of the module M so that it can be inserted or removed with the frame or while the frame 3–6 is located in the illustrated position.

An important advantage of the improved photographic apparatus is that, in contrast to the presently prevailing practice of subdividing the exposure control system into several discrete modules, the exposure control system of the present invention constitutes a single module which contains a diaphragm as well as one or more light deflecting and/or dispersing devices and which may but need not contain an energy source. Due to the provision of aforedescribed simple coupling and detent means, the module can be installed or removed with little loss in time and without necessitating the use of any tools. This contributes to lower initial cost and facilitates the work of a repairman because the module Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended:

1. A photographic apparatus, comprising picture taking lens means; exposure control means comprising a plurality of components including adjustable diaphragm means, means for adjusting said diaphragm means as a function of changes in scene brightness and means for reflecting a portion of scene light which enters the apparatus by way of said picture taking lens means, said components forming part of a single prefabricated module; and detent means for releasably holding said module in a predetermined position, including a movable detent member mounted in and accessible from the outside of said apparatus.

2. A photographic apparatus as defined in claim 1, wherein said detent means further includes a second member provided on said module and cooperating with said movable detent member to separably mount said module in said predetermined position.

3. A photographic apparatus as defined in claim 1, further comprising a housing for said module.

4. A photographic apparatus as defined in claim 1, wherein said exposure control means further includes an electric circuit having a plurality of elements mounted on a frame forming part of said module.

5. A photographic apparatus as defined in claim 1, wherein one of said components constitutes a source of electrical energy.

6. A photographic apparatus as defined in claim 5, wherein said means for adjusting said diaphragm means comprises photosensitive transducer means constituting said source of electrical energy.

7. A photographic apparatus having exposure control means comprising a plurality of components including adjustable diaphragm means, means for adjusting said diaphragm means as a function of changes in scene brightness, and means for deflecting at least one portion of incoming scene light, said components forming part of a single prefabricated module and including at least one current-consuming component, and further comprising detent means for releasably holding said module in a predetermined position, said detent means including a movable detent member mounted in and accessible from the outside of said apparatus, and a source of electrical energy mounted in said detent member and conductor means connecting said current-consuming component with said source in said predetermined position of said module, said detent member being movable between an operative position in which said module is held in said predetermined position and a second position in which said detent member facilitates access to said source from the outside of said apparatus.

8. A photographic apparatus, comprising picture taking lens means; exposure control means comprising a plurality of components including adjustable diaphragm means, means for adjusting said diaphragm means as a function of changes in scene brightness and means for reflecting a portion of scene light which enters the apparatus by way of said picture taking lens means, said components including at least one current-consuming component and forming part of a single prefabricated module; coupling means for separably mounting said module in a predetermined position; a source of electrical energy; and conductor means connecting said source with said current-consuming component, said conductor means including at least a portion of said coupling means.

* * * * *